US010773189B2

(12) United States Patent
Böhnke et al.

(10) Patent No.: US 10,773,189 B2
(45) Date of Patent: Sep. 15, 2020

(54) LIQUID FILTRATION APPARATUS

(71) Applicant: OUTOTEC (FINLAND) OY, Espoo (FI)

(72) Inventors: Bernd Böhnke, Düsseldorf (DE); Kari Vänttinen, Espoo (FI); Saku Eronen, Lappeenranta (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/793,194

(22) Filed: Feb. 18, 2020

(65) Prior Publication Data

US 2020/0188818 A1 Jun. 18, 2020

Related U.S. Application Data

(63) Continuation of application No. PCT/FI2017/050589, filed on Aug. 23, 2017.

(51) Int. Cl.
*B01D 25/164* (2006.01)
*F16J 15/46* (2006.01)

(52) U.S. Cl.
CPC ............ *B01D 25/164* (2013.01); *F16J 15/46* (2013.01); *B01D 2201/342* (2013.01)

(58) Field of Classification Search
CPC ................................ B01D 25/164; F16J 15/46
See application file for complete search history.

(56) References Cited

U.S. PATENT DOCUMENTS 3,117,083 A 1/1964 Przhilensky
3,687,292 A 8/1972 Miura
4,430,231 A 2/1984 Bratten
4,861,494 A 8/1989 Bratten

FOREIGN PATENT DOCUMENTS

EP 0479315 A1 4/1992

OTHER PUBLICATIONS

International Search Report issued by the Finnish Patent and Registration Office acting as the International Searching Authority in relation to International Application No. PCT/FI2017/050589 dated Dec. 7, 2017 (5 pages).
Written Opinion of the International Searching Authoirty issued by the Finnish Patent and Registration Office acting as the International Searching Authority in relation to International Application No. PCT/FI2017/050589 dated Dec. 7, 2017 (7 pages).
International Preliminary Report on Patentability issued by the European Patent Office acting as the International Preliminary Examining Authority in relation to International Application No. PCT/FI2017/050589 dated Jul. 26, 2019 (5 pages).

*Primary Examiner* — Chester T Barry
(74) *Attorney, Agent, or Firm* — Robert P. Michal, Esq.; Carter, DeLuca & Farrell LLP

(57) ABSTRACT

A liquid filtration apparatus includes a series of upright filter plates forming a filter plate pack. Filtering spaces are formed in the filter plate pack. The liquid filtration apparatus includes at least one filtering space and a filter chamber that is at least partly limited laterally by a filter media. The filtering spaces have an elongate bottom discharge opening limited by two first opposite side walls and provided with a first inflatable and deflatable hose seal extending across the elongate bottom discharge opening and configured to selectively open and close the elongate bottom discharge opening at the first inflatable and deflatable hose seal. The first inflatable and deflatable hose seal are in the elongate bottom discharge opening fastened at one of the first opposite side walls of the elongate bottom discharge opening.

18 Claims, 14 Drawing Sheets

LIQUID FILTRATION APPARATUS

CROSS-REFERENCE TO RELATED APPLICATIONS

This application is a continuation of PCT International Application No. PCT/FI2017/050589 filed Aug. 23, 2017, the disclosure of this application is expressly incorporated herein by reference in its entirety.

FIELD OF THE INVENTION

The invention relates to a liquid filtration apparatus.

More precisely, the invention relates to a liquid filtration apparatus comprising a series of upright vertical filter plates forming a filter plate pack. Filtering spaces is formed in the filter plate pack and the liquid filtration apparatus comprises in at least one filtering space a filter chamber that is limited laterally by a filter media. Said at least one filtering space has an elongate bottom discharge opening that can be closed and opened by means of a first inflatable and deflatable hose seal.

The liquid filtration apparatus can be configured to perform at least:

1. A filling stage, during which the elongate bottom discharge opening of said at least one filtering space is closed by means of the first inflatable and deflatable hose seals and material is fed into the filter chamber.

2. A filtration stage, during which the elongate bottom discharge opening of said at least one filtering space is closed by means of the first inflatable and deflatable hose seal, and pressure is by means of a pressure arrangements exerted to the material in the filter chamber to cause liquid of the material to flow through the filter media and to form filter cake of the material in the filter chamber.

3. A discharge stage, during which the elongate bottom discharge opening is opened by means of the first inflatable and deflatable hose seal to allow filter cake to fall by means of gravity out of the filter chamber.

OBJECTIVE OF THE INVENTION

The object of the invention is to provide a liquid filtration apparatus that on one hand provides for tight closing of the elongate bottom discharge opening of the filtering spaces but that on the other hand enables for effective flow of filter cake through the bottom discharge openings.

SHORT DESCRIPTION OF THE INVENTION

The invention relates also to the use of the liquid filtration apparatus for filtering material in the form of tailings from mining, or in the form of products of bulk mining such as products containing iron, phosphate, or apatite. The volume of such material is normally big and such material contains a lot of water that can be recycled for re-use in the mining operation.

LIST OF FIGURES

Figure 1:
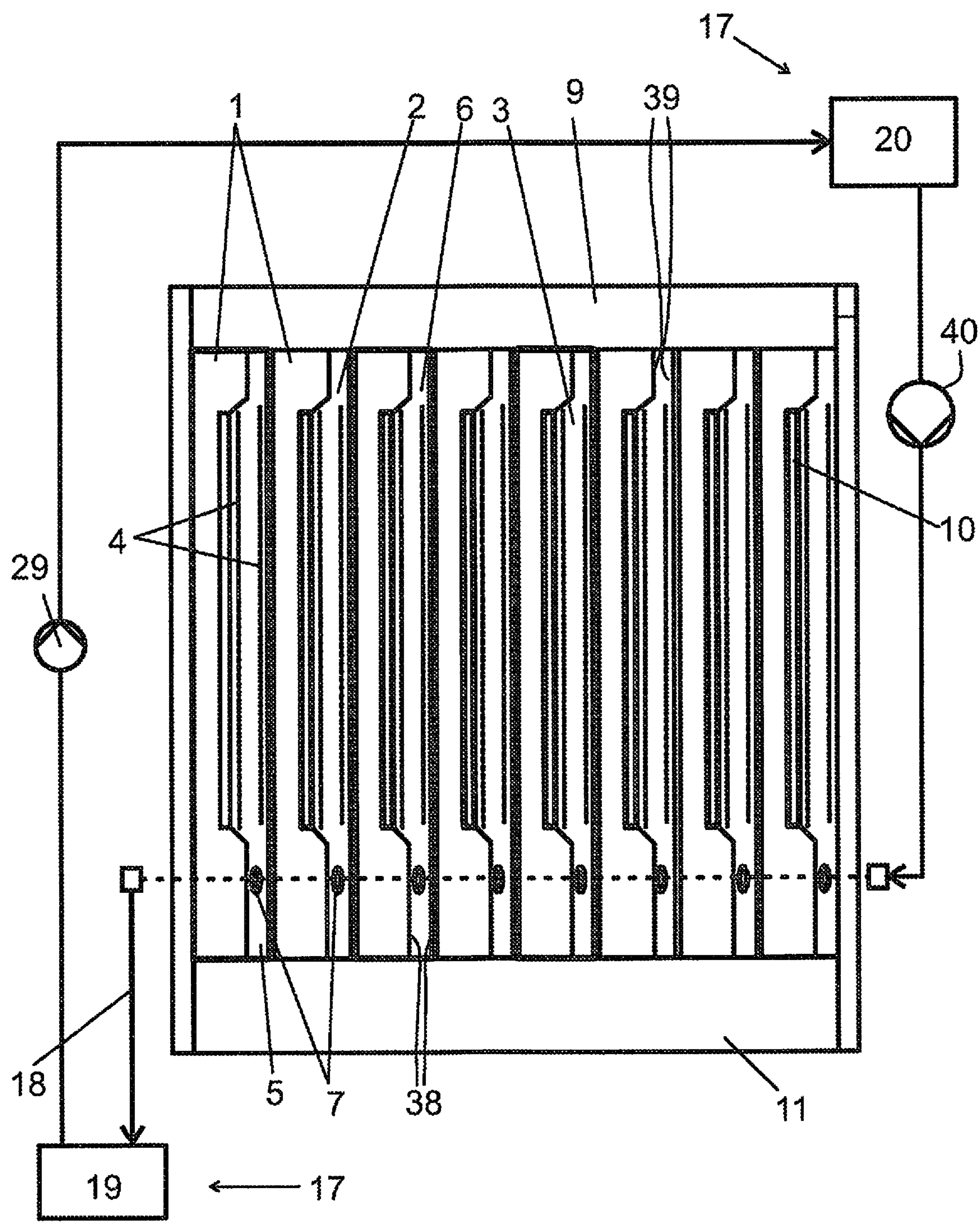
Figure 2:
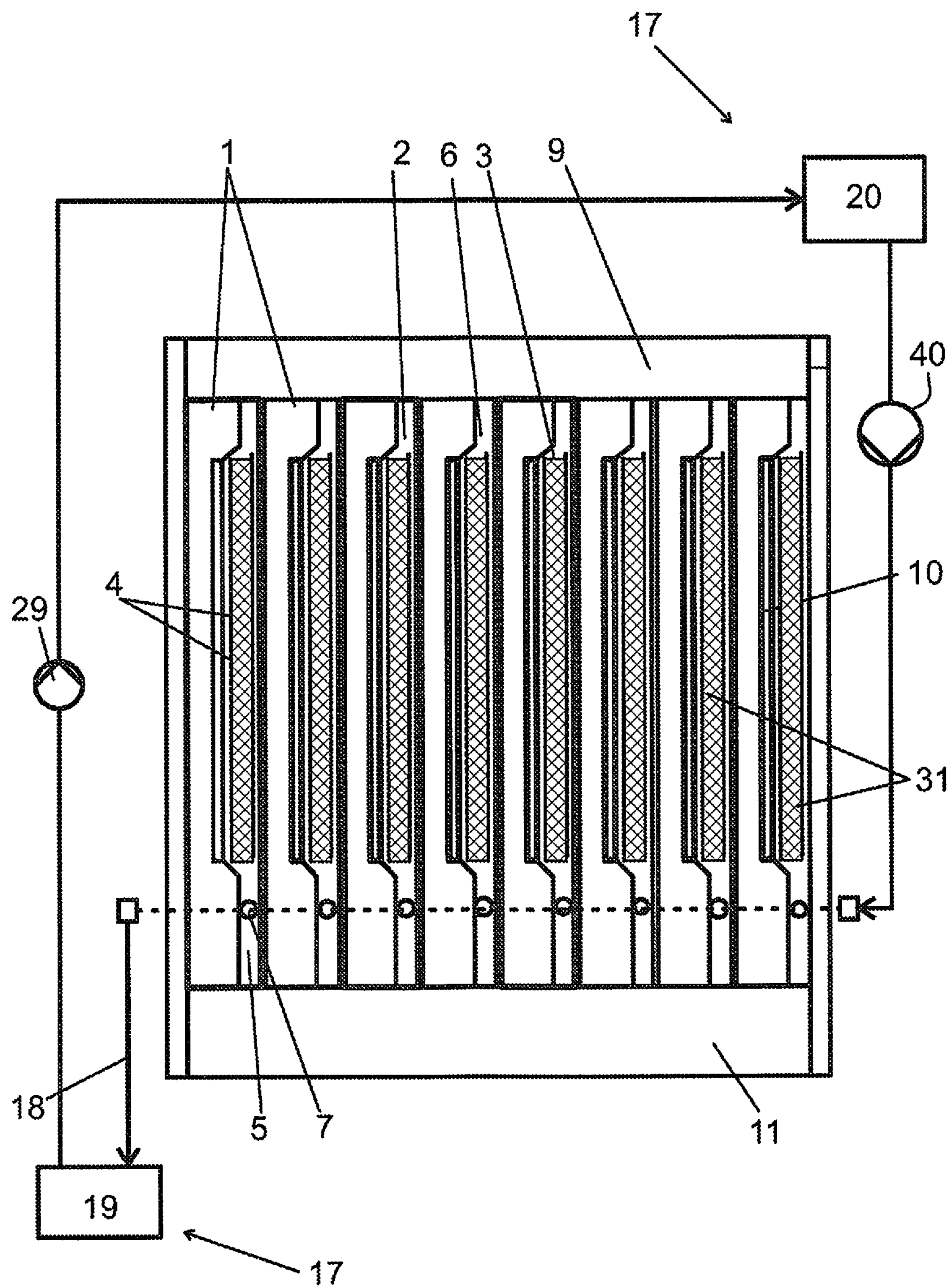
Figure 3:
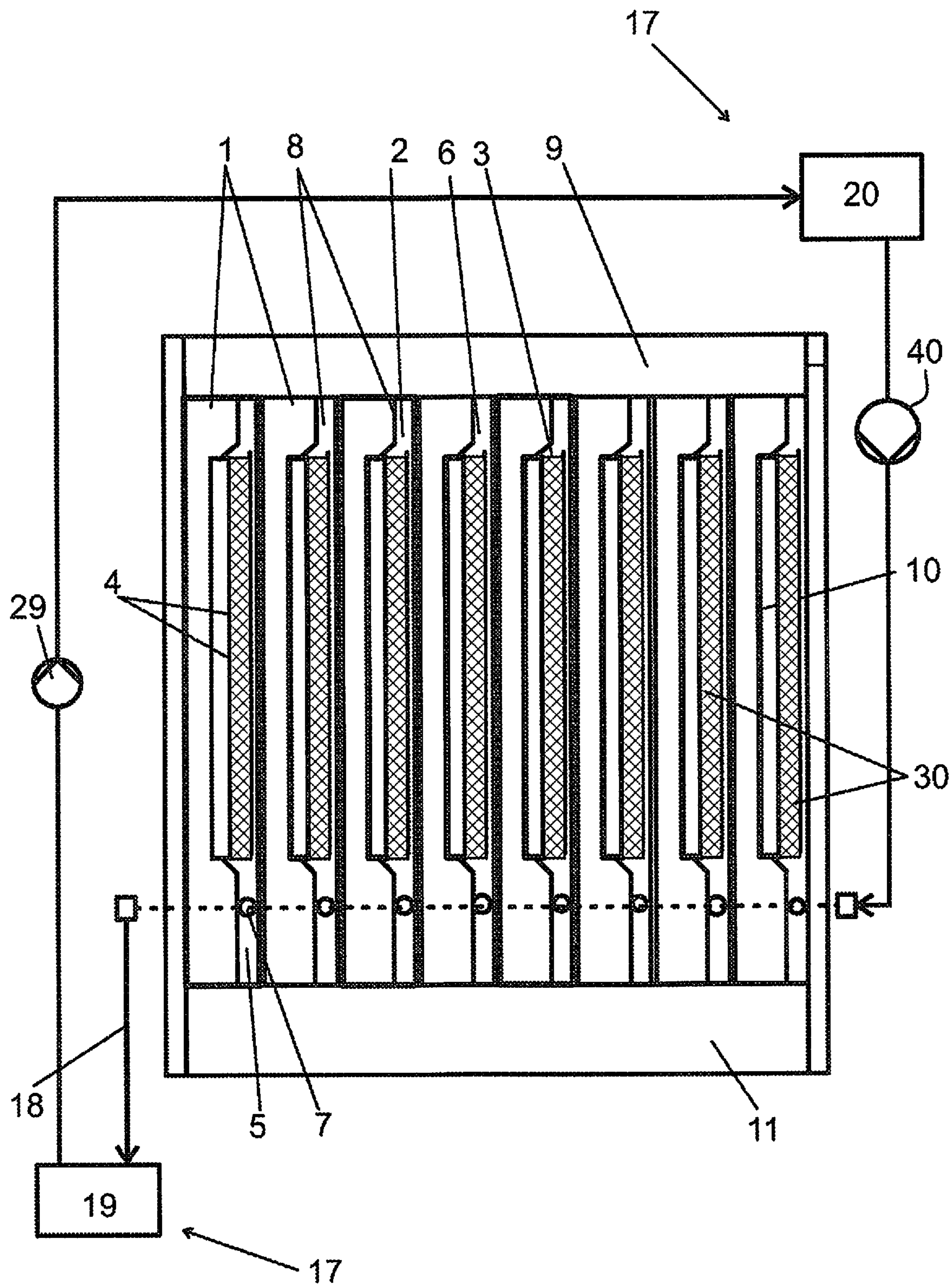
Figure 4:
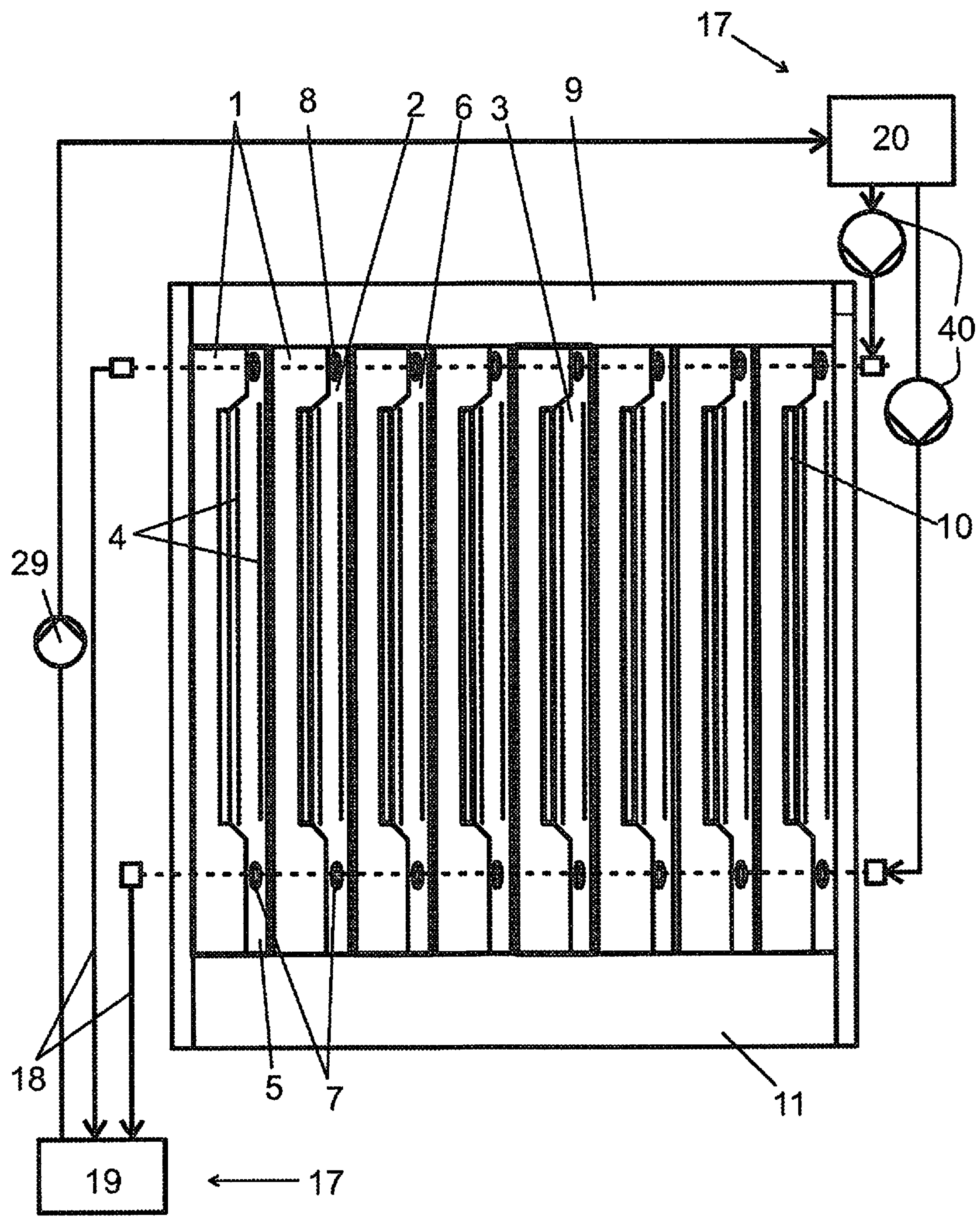
Figure 5:
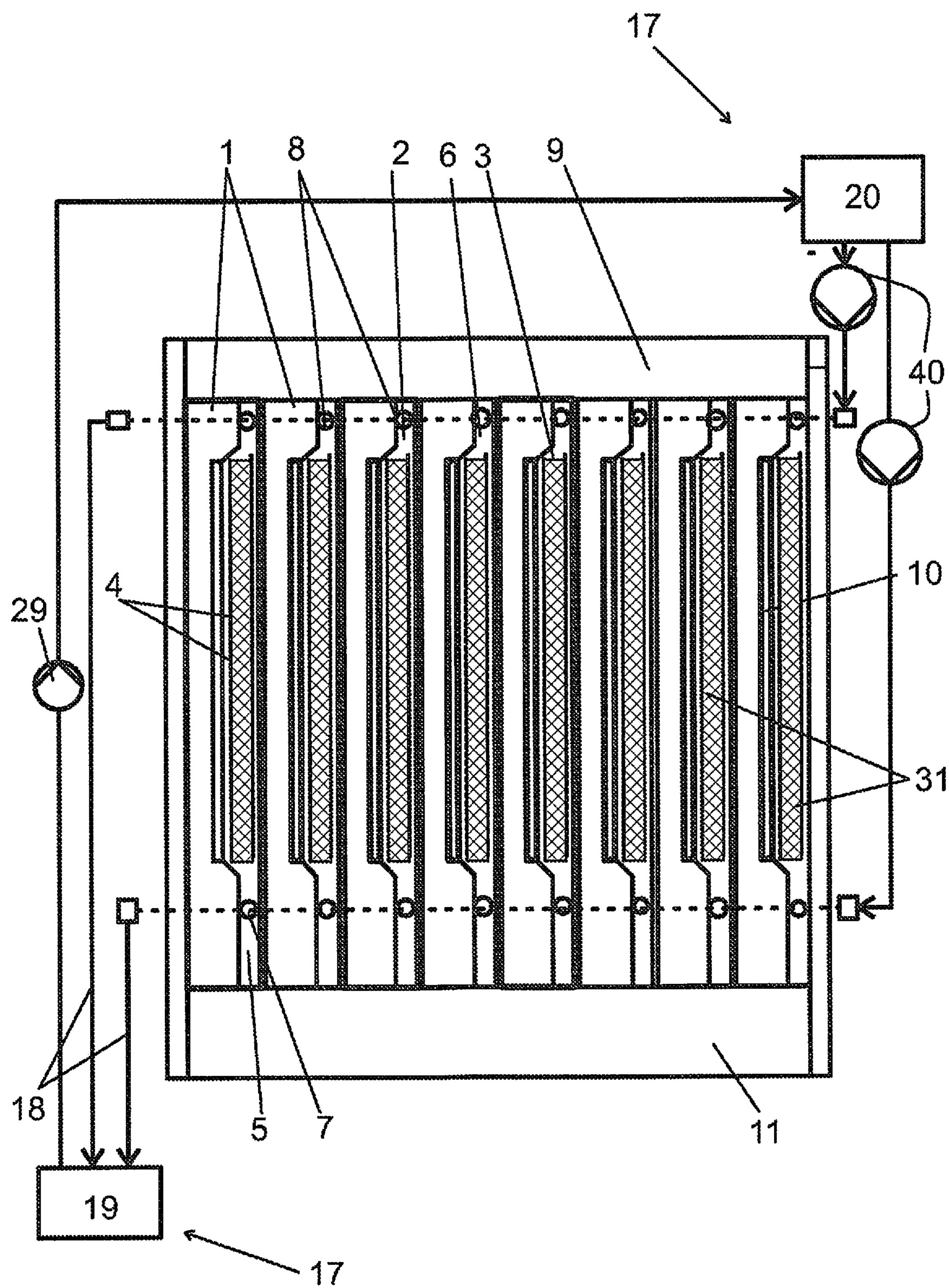
Figure 6:
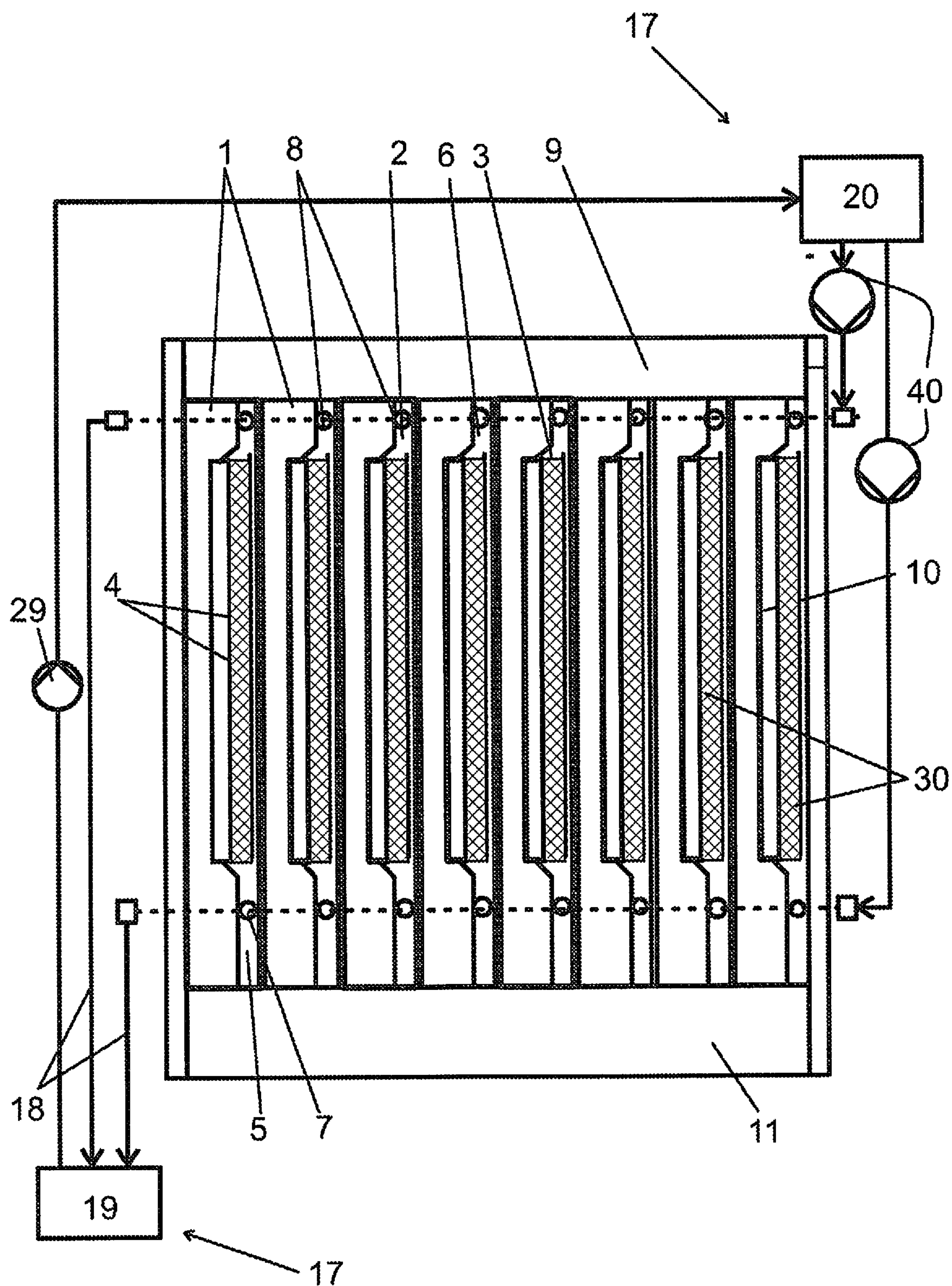
Figure 7:
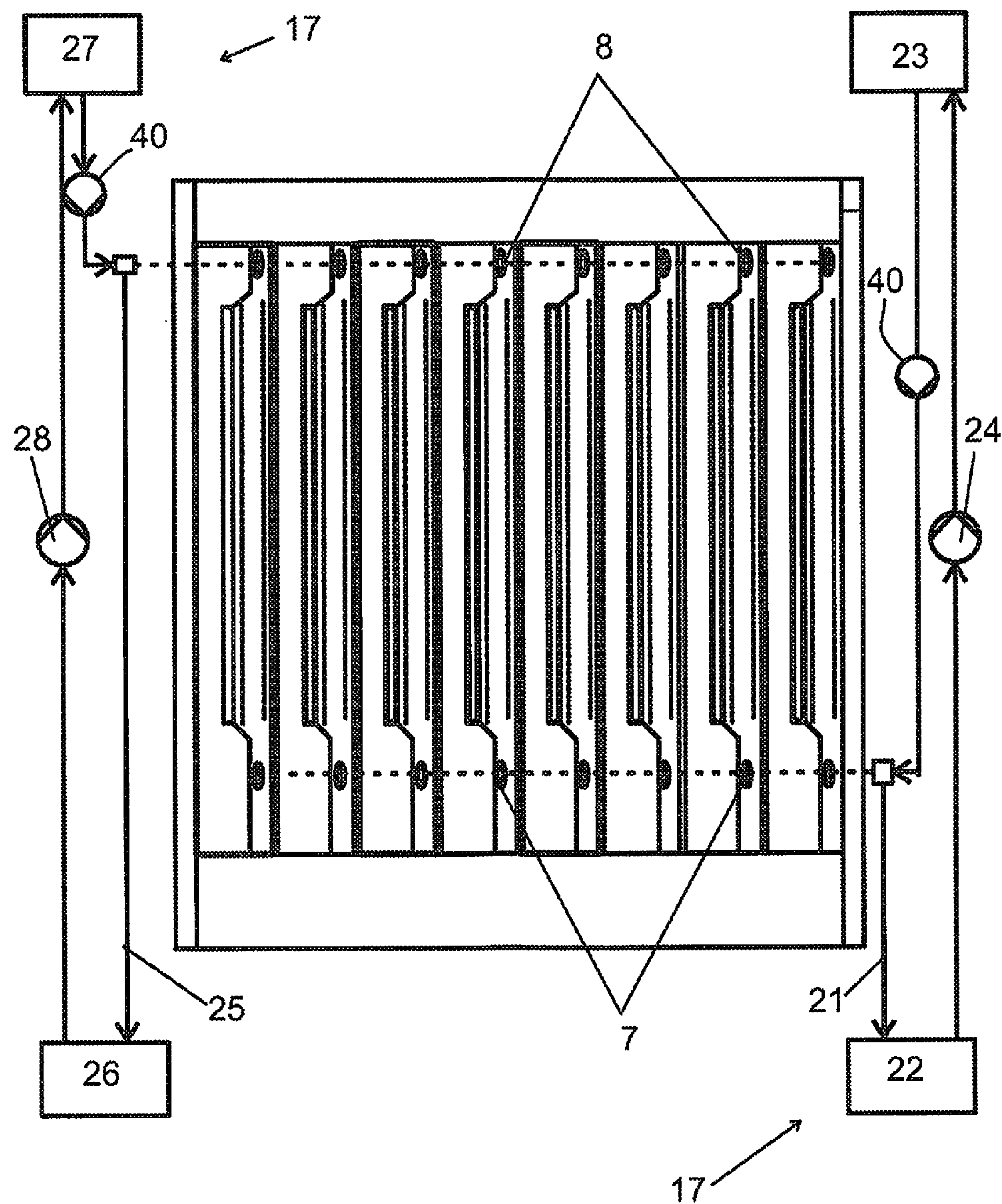
Figure 8:
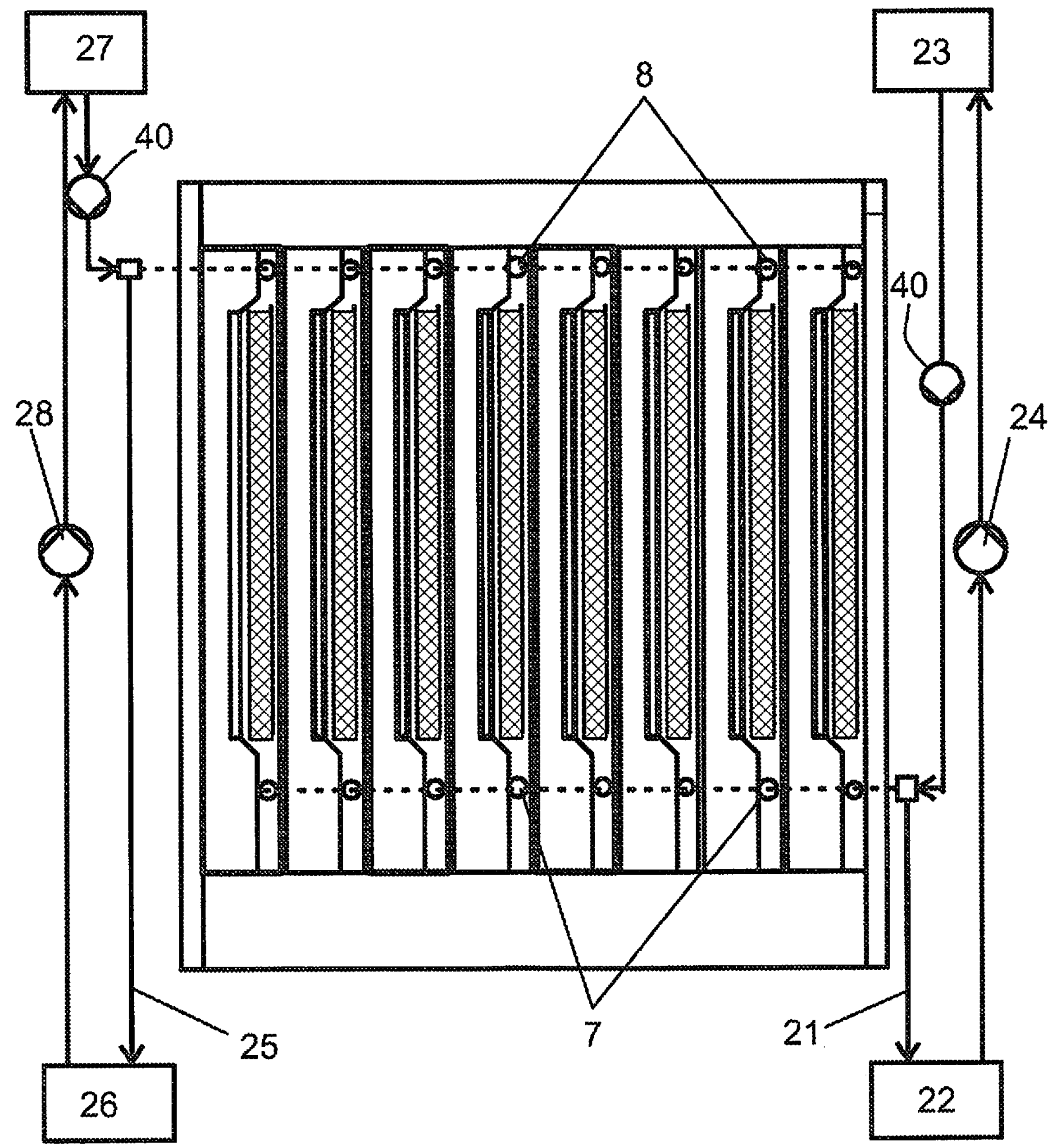
Figure 9:
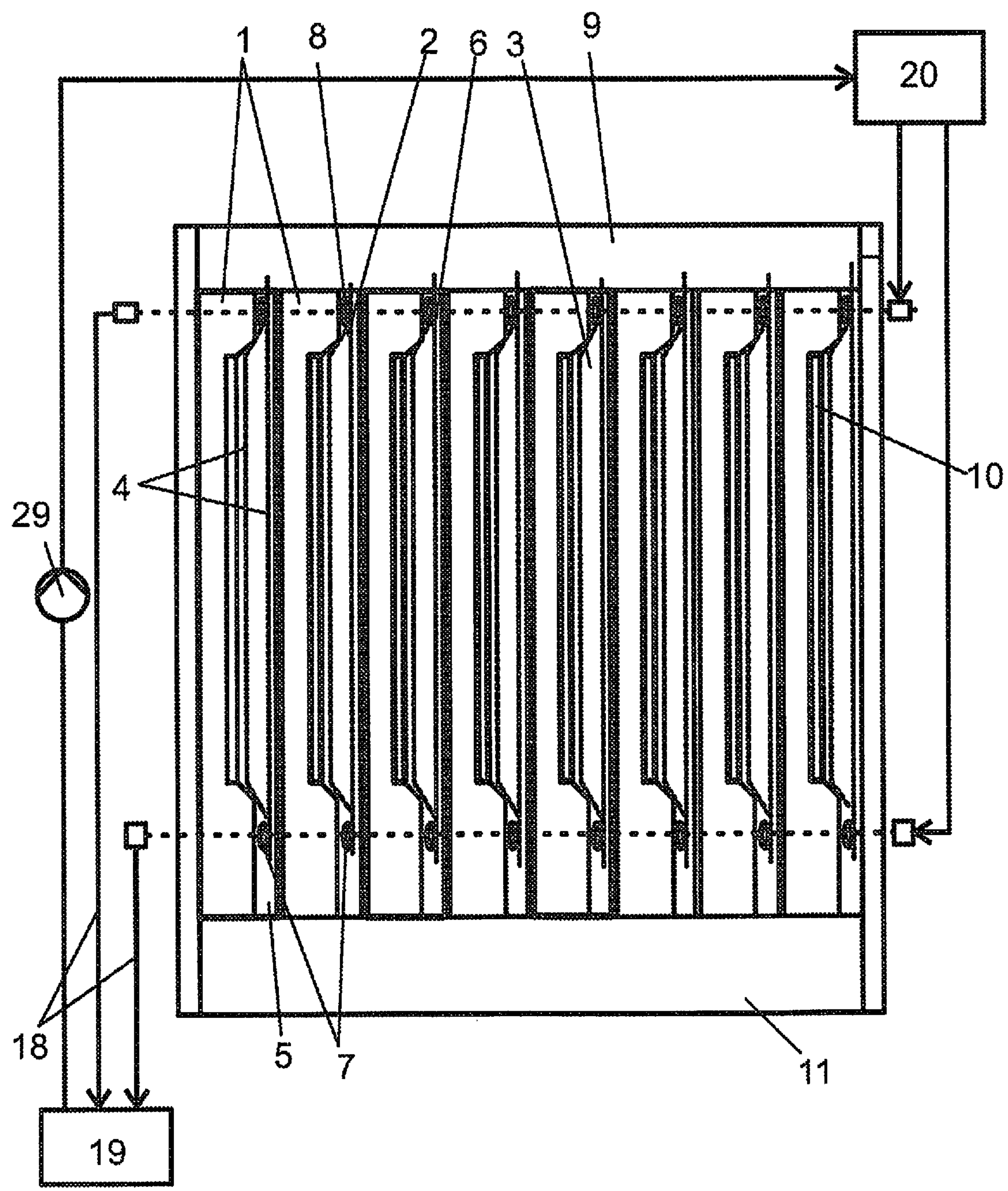

In the following the invention will described in more detail by referring to the figures, of which FIG. 1 is a side view of a first embodiment of the liquid filtration apparatus in a situation, where the first inflatable and deflatable hose seals are deflated, FIG. 2 is a side view of a first embodiment of the liquid filtration apparatus in a situation, where the first inflatable and deflatable hose seals are inflated, FIG. 3 is a side view of a first embodiment of the liquid filtration apparatus in a situation, where the first inflatable and deflatable hose seals are inflated and pressure is exerted on material in the filter chambers by means of the pressure arrangements to form filter cake, FIG. 4 is a side view of a second embodiment of the liquid filtration apparatus in a situation, where the first inflatable and deflatable hose seals and the second inflatable and deflatable hose seals are deflated, FIG. 5 is a side view of a second embodiment of the liquid filtration apparatus in a situation, where the first inflatable and deflatable hose seals and the second inflatable and deflatable hose seals are inflated, FIG. 6 is a side view of a second embodiment of the liquid filtration apparatus in a situation, where the first inflatable and deflatable hose seals and the second inflatable and deflatable hose seals are inflated and pressure is exerted on material in the filter chambers by means of the pressure arrangements to form filter cake, FIG. 7 is a side view of a third embodiment of the liquid filtration apparatus in a situation, where the first inflatable and deflatable hose seals and the optional second inflatable and deflatable hose seals are deflated, FIG. 8 is a side view of a third embodiment of the liquid filtration apparatus in a situation, where the first inflatable and deflatable hose seals and the optional second inflatable and deflatable hose seals are inflated, FIG. 9 is a side view of a fourth embodiment of the liquid filtration apparatus in a situation, where the first inflatable and deflatable hose seals and the optional second inflatable and deflatable hose seals are deflated.

Figure 10:
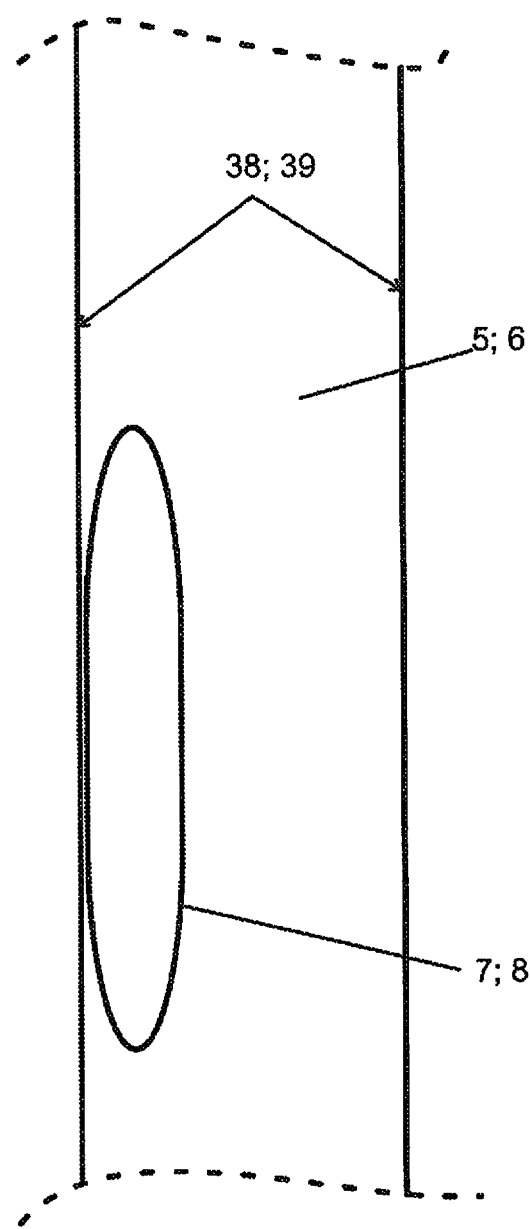
Figure 11:
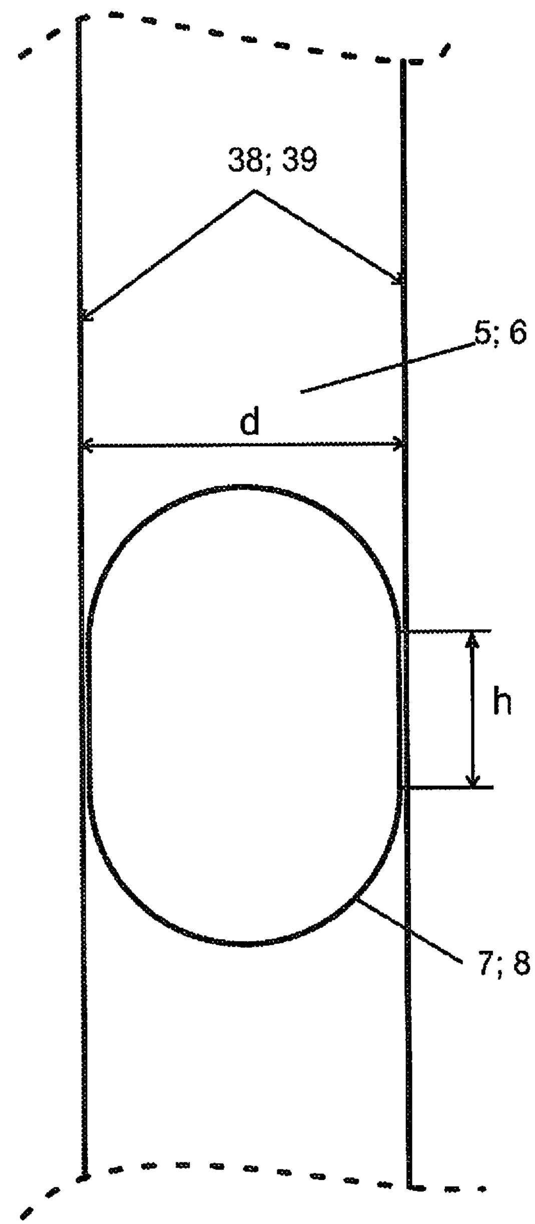
Figure 12:
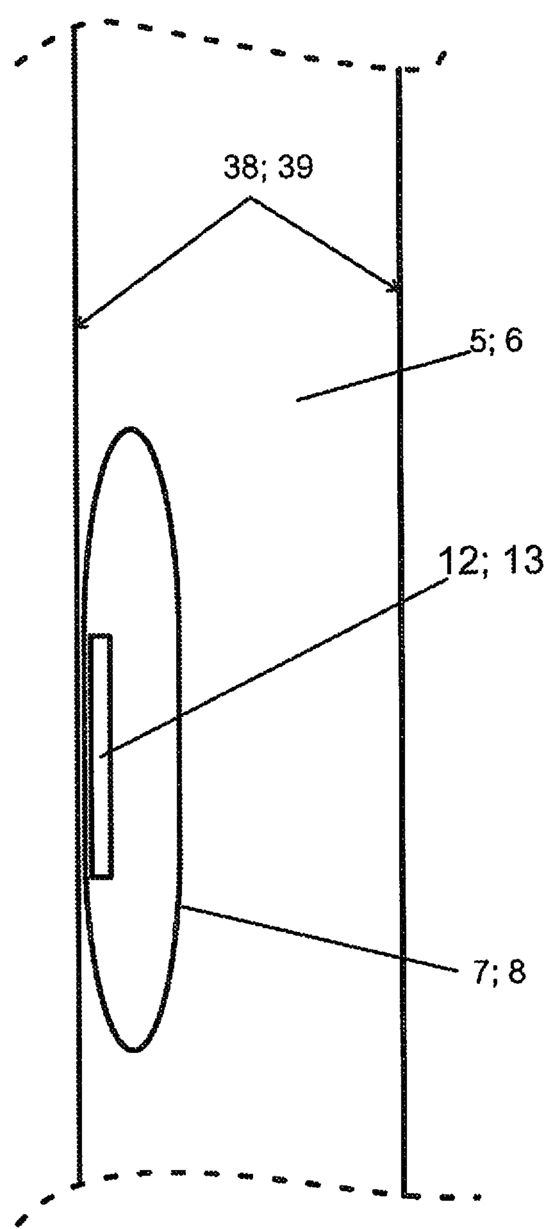
Figure 13:
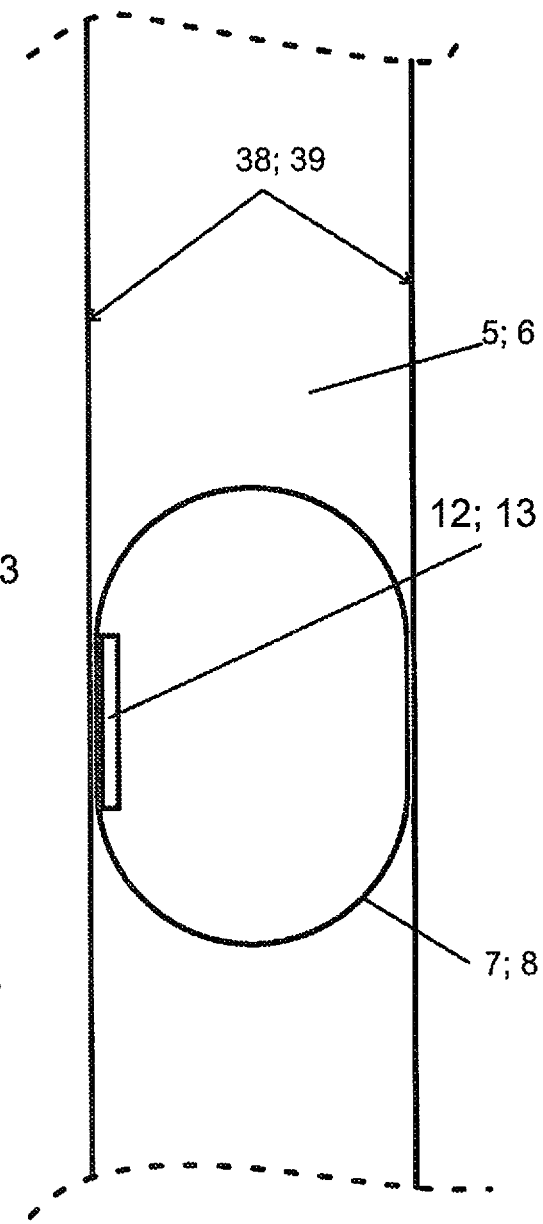
Figure 14:
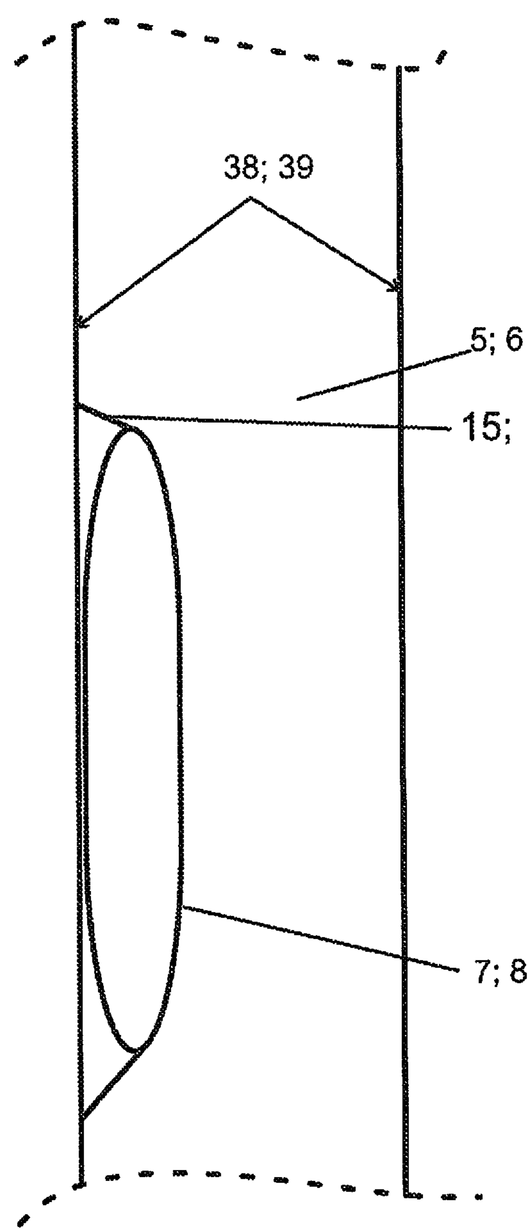
Figure 15:
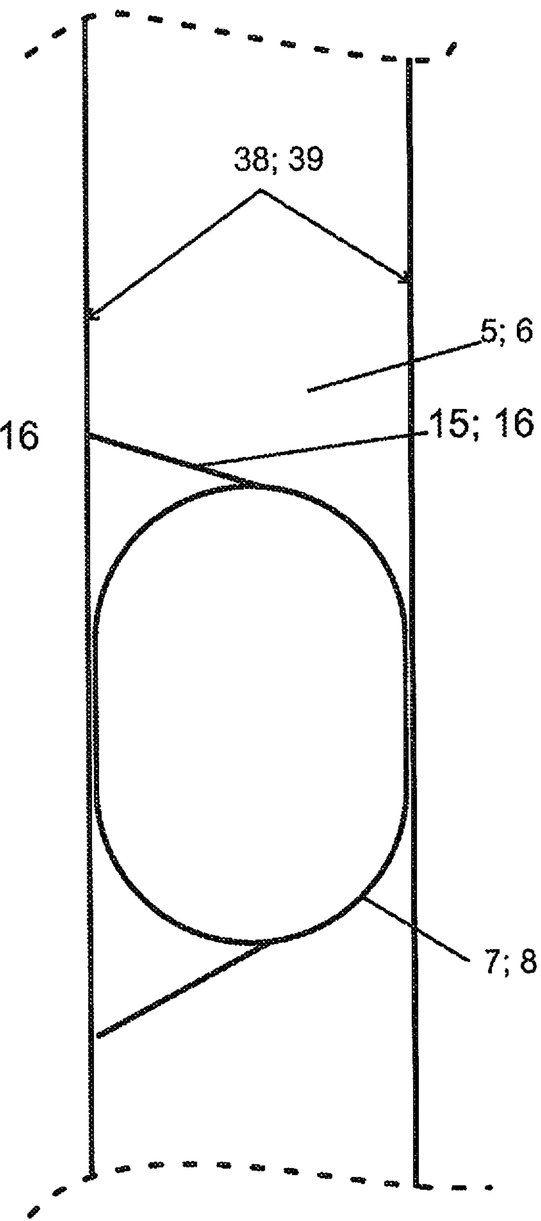
Figures 16, 17:
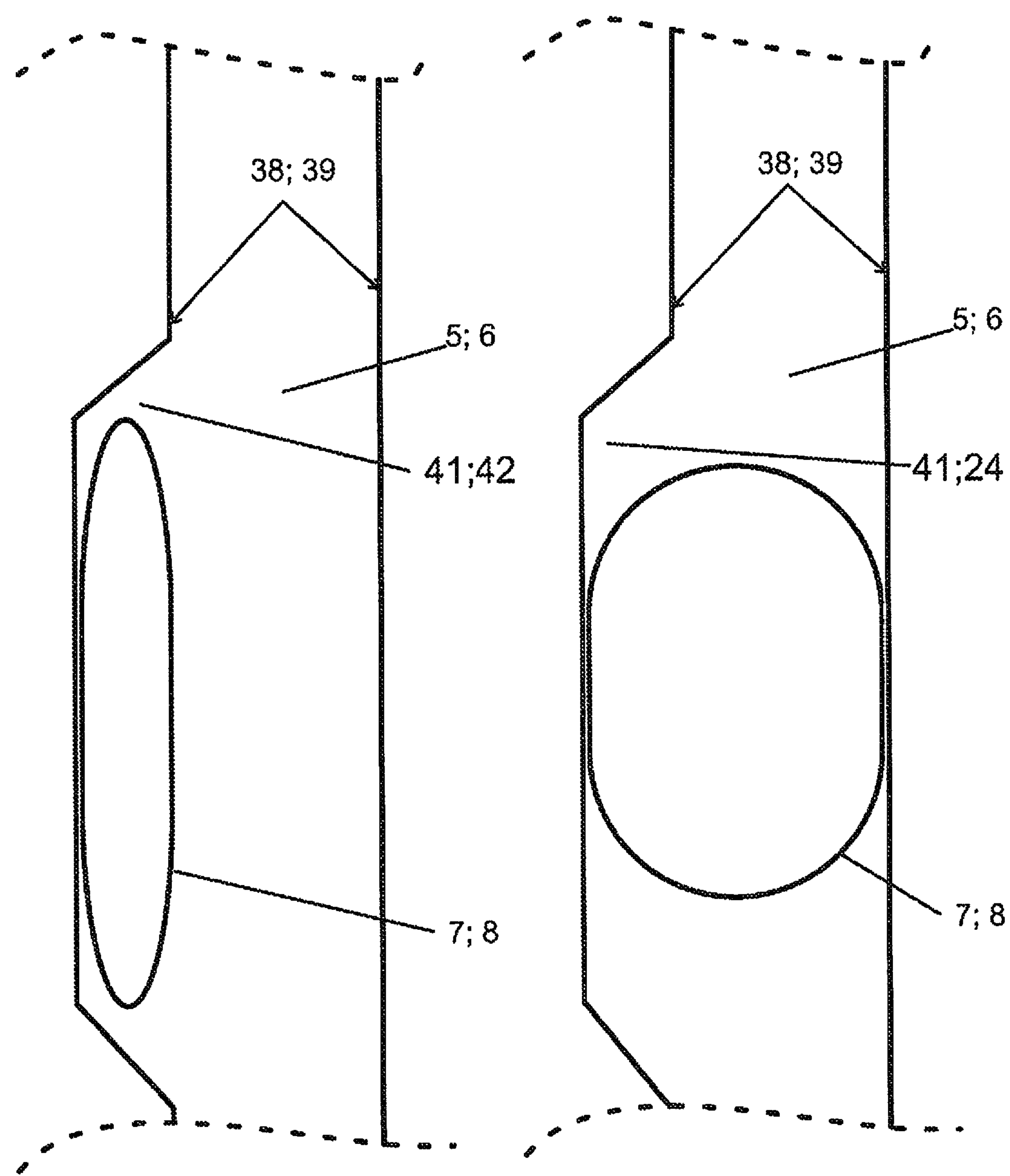
Figure 18:
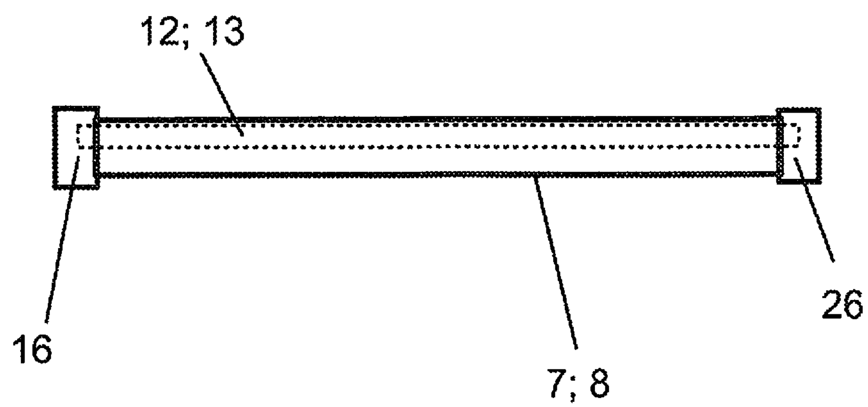
Figure 19:
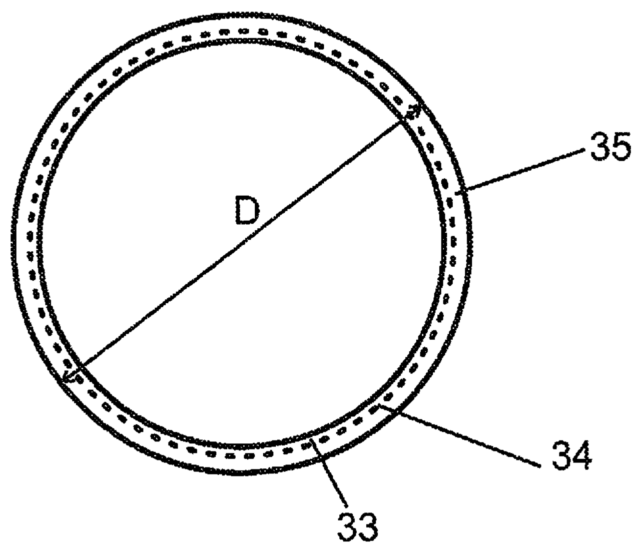
Figure 20:
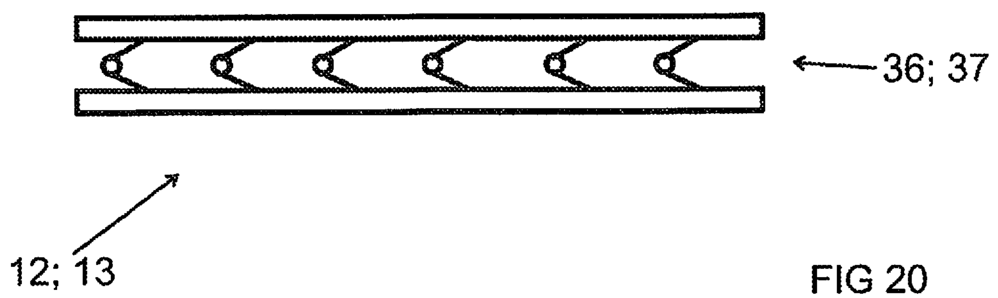

FIG. 10 shows the elongate bottom discharge opening in an embodiment of the liquid filtration apparatus in a situation, where the elongate bottom discharge opening is open, because the first inflatable and deflatable hose seal is deflated, FIG. 11 shows the elongate bottom discharge opening in an embodiment of the liquid filtration apparatus in a situation, where the elongate bottom discharge opening is closed, because the first inflatable and deflatable hose seal is inflated, FIG. 12 shows the elongate bottom discharge opening in an embodiment of the liquid filtration apparatus in a situation, where the elongate bottom discharge opening is open, because the first inflatable and deflatable hose seal is deflated, FIG. 13 shows the elongate bottom discharge opening in an embodiment of the liquid filtration apparatus in a situation, where the elongate bottom discharge opening is closed, because the first inflatable and deflatable hose seal is inflated, FIG. 14 shows the elongate bottom discharge opening in an embodiment of the liquid filtration apparatus in a situation, where the elongate bottom discharge opening is open, because the first inflatable and deflatable hose seal is deflated, FIG. 15 shows the elongate bottom discharge opening in an embodiment of the liquid filtration apparatus in a situation, where the elongate bottom discharge opening is closed, because the first inflatable and deflatable hose seal is inflated, FIG. 16 shows the elongate bottom discharge opening in an embodiment of the liquid filtration apparatus in a situation, where the elongate bottom discharge opening is open, because the first inflatable and deflatable hose seal is deflated, FIG. 17 shows the elongate bottom discharge opening in an embodiment of the liquid filtration apparatus in a situation, where the elongate bottom discharge opening is closed, because the first inflatable and deflatable hose seal is inflated, FIG. 18 is a side view of a deflatable and inflatable hose seal, FIG. 19 is a cut view of a deflatable and inflatable hose seal, and FIG. 20 is a side view of a support member.

DETAILED DESCRIPTION OF THE INVENTION

The liquid filtration apparatus comprises a series of upright filter plates 1 forming a filter plate pack (not marked with a reference numeral). The number of filter plates can for example be between 10 and 500.

The upright filter plates 1 can, as shown in the figures, be arranged aligned and vertically in the filter plate pack.

The filter plates 1 can be arranged horizontally immovable in contact with each other in the filter plate pack, when the filter plates 1 forms the filter pack. Individual filter plates can however be removed from the filter plate pack for example for maintenance of filter plates 1, when the liquid filtration apparatus is not performing filtration of material.

Filtering spaces 2 is formed in the filter plate pack.

The filtering spaces 2 can be provided within the upright filter plates 1 of the filter plate pack and/or between two adjacent upright filter plates 1 of the filter plate pack.

The liquid filtration apparatus comprises in each filtering space 2 a filter chamber 3 that is at least partly limited laterally by a filter media 4. The liquid filtration apparatus comprises preferably, but not necessarily, a filter media 4 in each filtering space 2 of the filter plate pack.

Each filtering space 2 of the filter plate pack has an elongate bottom discharge opening 5 limited by two opposite first side walls 38 and optionally by two opposite first end walls. The liquid filtration apparatus comprises preferably a filter media 4 in each filtering space 2 of the filter plate pack and an elongated bottom discharge opening 5 below each filter chamber 3 of the filter plate pack.

The liquid filtration apparatus comprises preferably, but not necessarily, additionally a material feeding arrangement 9 configured to feed material 31 to be filtered into filtering space(s) 2 of the filter plate pack.

The liquid filtration apparatus comprises preferably, but not necessarily, additionally a pressure arrangement 10 configured to exert pressure on material 31 fed into filtering space(s) 2 of the filter plate pack so as to remove liquid (not shown in the figures) from the material 31 and to form filter cake 30 of the material 31, as shown in FIGS. 3 and 6. The pressure arrangement 10 can comprise a flexible and waterproof diaphragm provided in each filtering space 2 of the filter plate pack. Alternatively or additionally can the material feeding arrangement 9 function as the/a pressure arrangement 10. In such case material 31 is fed into filter chambers 3 of the filter plate pack so that pressure is built-up in filter chambers 3 of the filter plate pack causing liquid of the material to be separated from the material and to pass through the filter media 4 so that filter cake is formed in the filter chambers 3 of the filter plate pack.

The liquid filtration apparatus comprises preferably, but not necessarily, additionally a filter cake receiving arrangement 11 configured to receive filter cake 30 from filtering space(s) 2 of the filter plate pack through the elongate bottom discharge opening(s) 5 of the filtering space(s) 2.

At least one elongate bottom discharge opening 5 of one intermediate space 2 of the filter plate pack is provided with a first inflatable and deflatable hose seal 7 extending across said at least one elongate bottom discharge opening 5 and configured to selectively open and close said at least one elongate bottom discharge opening 5 at the first inflatable and deflatable hose seal 7. More preferable, each elongate bottom discharge opening 5 of the intermediate spaces 2 of the filter plate pack is provided with a first inflatable and deflatable hose seal 7 extending across the elongate bottom discharge opening 5 and configured to selectively open and close the elongate bottom discharge opening 5 at the first inflatable and deflatable hose seal 7.

The first inflatable and deflatable hose seal(s) 7, when inflated, are configured to exert pressure against the first opposite side walls 38 of the elongated bottom discharge opening 5. The pressure causes friction between the first inflatable and deflatable hose seal 7 and the first opposite side walls 38 of the elongated bottom discharge opening 5, and the friction facilitates closing the elongated bottom discharge opening 5.

The first inflatable and deflatable hose seal 7 are preferably, but not necessarily, made of inflatable and deflatable hose seals having a circular cross-section having an outer diameter that is 120 to 400% of the distance d between the two first opposite side walls 38. This to ensure a contact area between the first inflatable and deflatable hose seal 7 and the two first opposite side walls 38 that have a sufficient h as shown in FIG. 11 so as to provide sufficient friction between the first inflatable and deflatable hose seal 7 and the first opposite side walls 38 of the elongated bottom discharge opening 5.

At least one intermediate space 2 of the filter plate pack can be provided with an elongate top opening 6 that is limited by two second opposite side walls 39 and optionally two second end walls. More preferably, each intermediate space 2 of the filter plate pack is provided with an elongate top opening 6 that is limited by two second opposite side walls 39 and optionally two second end walls. Such elongate top opening 6 can, as shown in the embodiments illustrated in FIGS. 4 to 9, be provided with a second inflatable and deflatable hose seal 8 extending across the elongate top opening 6 and configured to selectively open and close the elongate top opening 6 at the second inflatable and deflatable hose seal 8.

The liquid filtration apparatus can be configured to perform at least:

1. A filling stage, during which the elongate bottom discharge opening 5 of the filtering spaces 2 are closed by means of first inflatable and deflatable hose seals 7 and material is fed from the material feeding arrangement 9 into the filter chambers 3.
2. A filtration stage, during which the elongate bottom discharge openings 5 of the filtering spaces 2 are closed by means of the first inflatable and deflatable hose seals 7, and pressure is by means of the pressure arrangements 10 exerted to the material 31 in the filter chambers 3 to cause liquid 32 of the material 31 to flow through the filter media 4 and to form filter cake 30 of the material 31 in the filter chambers 3.
3. A discharge stage, during which the elongate bottom discharge openings 5 are opened by means of the first inflatable and deflatable hose seals 7 to allow filter cake 30 to fall by means of gravity out of the filter chambers 3.

The first inflatable and deflatable hose seals 7 are in the elongate bottom discharge opening(s) 5 fastened at one of the first opposite side walls 38 of the elongate bottom discharge opening 5 so that the first inflatable and deflatable hose seal 7 is in a deflated state configured to be at the said one of the first opposite side walls 38 of the elongate bottom discharge opening 5 and so the first inflatable and deflatable hose seal 7 is in an inflated state configured to extend between the first opposite side walls 38 of the elongate bottom discharge opening 5, The first inflatable and deflatable hose seal(s) 7 can be fastened in the elongate bottom discharge opening(s) 5 from the ends of the first inflatable and deflatable hose seal(s) 7.

The first inflatable and deflatable hose seal 7 can in the elongate bottom discharge opening 5 be arranged at least partly in a first recess 41 that preferably, but not necessarily, has an elongated configuration, in said one of the first opposite side walls 38 of the elongate bottom discharge opening 5. The first recess 41 provides for protection for the first inflatable and deflatable hose seal 7 and provides for more space for discharging of filter cake from the filtering space 2 when the first inflatable and deflatable hose seal 7 is deflated.

The optional second inflatable and deflatable hose seals 8 can in the optional elongate top opening 6 be fastened at one of the two second opposite side walls 39 of the elongate top opening 6 so that the second inflatable and deflatable hose seal 8 is in a deflated state configured to be at the said one of the second opposite side walls 39 of the elongate top opening 6 and so the second inflatable and deflatable hose seal 8 is in an inflated state configured to extend between the second opposite side walls 39 of the elongate top opening 6.

The optional second inflatable and deflatable hose seal(s) 8 can be fastened in the elongate top opening(s) 6 from the ends of the second inflatable and deflatable hose seal(s) 8.

The optional second inflatable and deflatable hose seal (8) can be in the elongate top opening (6) arranged at least partly in a second recess 42 in said one of the second opposite side walls 39 of the elongate top opening 6.

A lower end of the filter media 4 is preferably, but not necessarily, at a level above the first inflatable and deflatable hose seal 7.

A lower end of the filter media 4 is preferably, but not necessarily, at a level below the first inflatable and deflatable hose seal 7, as shown in FIG. 9.

The first inflatable and deflatable hose seal 7 closes the filter media 4 to prevent material 31 from leaking out through the lower end of the filter media 4.

An upper end of the filter media 4 is preferably, but not necessarily, at a level above the second inflatable and deflatable hose seal 8, as shown in FIG. 9, provided that the liquid filtration apparatus is provided with such second inflatable and deflatable hose seals 8.

The optional second inflatable and deflatable hose seal 7 closes the filter media 4 to prevent material 31 from leaking out through the upper end of the filter media 4.

A first support member 12 is preferably, but not necessarily, provided for supporting the first inflatable and deflatable hose seal 7. Such first support member 12 extend at least partly, preferably fully, across the elongated bottom discharge opening 5. Such first support member 12 extend preferably, but not necessarily, in the same direction as the first inflatable and deflatable hose seal 7.

The first support member 12 is preferably, but not necessarily, provided in or at the first inflatable and deflatable hose seal(s) 7. The optional first support member(s) 12 prevents sacking of the first inflatable and deflatable hose seal(s) 7.

The optional first support member(s) 12 can, as shown in FIG. 20, be spring loaded by a first spring arrangement 36 so that the first support member 12 is configured to force the first inflatable and deflatable hose seal(s) 7 into a flat state to open the elongate bottom discharge opening 5 more when the first inflatable and deflatable hose seal(s) 7 is/are deflated. This provides for faster deflating of the first inflatable and deflatable hose seal(s) 7.

A second support member 13 is preferably, but not necessarily, provided for supporting the second inflatable and deflatable hose seal 8. Such second support member 13 extend at least partly, preferably fully, across the elongated top opening 6. Such second support member 13 extend preferably, but not necessarily, in the same direction as the second inflatable and deflatable hose seal 8.

The second support member 13 is preferably, but not necessarily, provided in or at the optional second inflatable and deflatable hose seal(s) 8.

The optional second support member 13 prevents sacking of the optional second inflatable and deflatable hose seal(s) 8.

The optional second support member(s) 13 can, as shown in FIG. 20, be spring loaded by a second spring arrangement 37 so that the second support member(s) 13 is/are configured to force the optional second inflatable and deflatable hose seal(s) 8 into a flat state to open the elongate top feed opening 6 more when the optional second inflatable and deflatable hose seal(s) 8 is/are deflated.

The first inflatable and deflatable hose seal(s) 7 can, as illustrated in FIGS. 14 and 15 be covered by a first outer flexible cover 14 that is fastened above and optionally also below each first inflatable and deflatable hose seal 7 to the same filter plate 1 at which the first inflatable and deflatable hose seal 7 is arranged.

The first outer flexible covers 14 forms protection for the first inflatable and deflatable hose seals 7.

The first outer flexible cover 14 can be spring loaded by a spring (not shown in the figures) that is configured to facilitate deflating or flattening of the first inflatable and deflatable hose seal 7. This provides for faster opening of the elongated bottom discharge opening(s) 5.

End plugs 16 can be provided at opposite ends of the first inflatable and deflatable hose seals 7, as shown in FIG. 18. The end plugs 16 forms fastening means for the first inflatable and deflatable hose seals 7 and supporting elements for the optional first support member 12.

The first inflatable and deflatable hose seals 7 can comprise a hose member comprising an inner rubber lining 33 and an outer rubber lining 34 and a textile or similar reinforcement 35. The first inflatable and deflatable hose seals 7 can have construction similar to fire hoses.

Each optional second inflatable and deflatable hose seal 8 can, as illustrated in FIGS. 14 and 15, be covered by a second outer flexible cover 15 that is fastened above and optionally also below each optional second inflatable and deflatable hose seal 8 to the same filter plate 1 as the optional second inflatable and deflatable hose seal 8 is fastened to.

The second outer flexible covers 15 forms protection for the optional second inflatable and deflatable hose seals.

The second outer flexible cover 15 can be spring loaded by a spring (not shown in the figures) that is configured to facilitate deflating or flattening of the optional second inflatable and deflatable hose seal 8.

End plugs 16 can be provided at opposite ends of the optional second inflatable and deflatable hose seals 8, as shown in FIG. 18. The end plugs 16 forms fastening means for the optional second inflatable and deflatable hose seals 8 and supporting elements for the optional second support member 13.

The optional second inflatable and deflatable hose seals 8 can comprise a hose member comprising an inner rubber lining 33 and an outer rubber lining 34 and a textile or similar reinforcement 35. The optional second inflatable and deflatable hose seals 8 can have construction similar to fire hoses.

The liquid filtration apparatus comprises preferably, but not necessarily, as illustrated in FIGS. 1 to 3 an inflating and deflating system 17 configured to inflate and deflate the first inflatable and deflatable hose seals 7.

The optional inflating and deflating system 17 can comprise valve means (not shown in the figures) configured to initiate inflating and deflating of the first inflatable and deflatable hose seals 7.

The optional inflating and deflating system 17 is preferably, but not necessarily, configured to inflate the first inflatable and deflatable hose seals 7 with fluid such as dense fluid, preferably with liquid such as with water. Using dense fluid such as liquid provides for precise adjustment of pressures and pressure gradients.

The optional inflating and deflating system 17 comprises preferably, but not necessarily, as shown in FIGS. 1 to 3, a barometric leg 18 in communication with the first inflatable and deflatable hose seals 7 and in communication with a lower tank 19 at a level below the first inflatable and deflatable hose seals 7. Such barometric leg 18 provides for complete and fast deflating (draining) of the first inflatable and deflatable hose seals 7.

The optional inflating and deflating system 17 comprises preferably, but not necessarily, as shown in FIGS. 1 to 3, a top tank 20 at a level above the first inflatable and deflatable hose seals 7. The top tank 20 is configured to inflate (fill) the first inflatable and deflatable hose seals 7 by gravity with liquid. A booster pump 40 may be provided downstream of the top tank 20 to force liquid into the first inflatable and deflatable hose seals 7 so as to increase the pressure in the first inflatable and deflatable hose seals 7.

If the optional inflating and deflating system 17 comprises a lower tank 19 and a top tank 20, as presented, the optional inflating and deflating system 17 comprises preferably, but not necessarily, as shown in FIGS. 1 to 3, a pump 29 configured to pump liquid from lower tank 19 to the top tank.

If the liquid filtration apparatus comprises both first inflatable and deflatable hose seals 7 and second inflatable and deflatable hose seals 8, as presented, the liquid filtration apparatus can, as illustrated in FIGS. 4 to 6, comprise an inflating and deflating system 17 configured to inflate and deflate both the first inflatable and deflatable hose seals 7 and the second inflatable and deflatable hose seals 8.

If the inflating and deflating system 17 is configured to inflate and deflate both the first inflatable and deflatable hose seals 7 and the optional second inflatable and deflatable hose seals 8, the inflating and deflating system 17 can comprise valve means (not shown in the figures) configured to initiate inflating and deflating of the first inflatable and deflatable hose seals 7 and of the second inflatable and deflatable hose seals 8.

If the inflating and deflating system 17 is configured to inflate and deflate both the first inflatable and deflatable hose seals 7 and the optional second inflatable and deflatable hose seals 8, the inflating and deflating system 17 is preferably, but not necessarily, configured to inflate the first inflatable and deflatable hose seals 7 and the second inflatable and deflatable hose seals 8 with fluid such as dense fluid, preferably with liquid such as with water. Using liquid provides for precise adjustment of pressures and pressure gradients.

If the inflating and deflating system 17 is configured to inflate and deflate both the first inflatable and deflatable hose seals 7 and the optional second inflatable and deflatable hose seals 8, the inflating and deflating system 17 comprises preferably, but not necessarily, as shown in FIGS. 4 to 6, a barometric leg 18 in communication with at least one of the first inflatable and deflatable hose seals 7 and the second inflatable and deflatable hose seals 8 and in communication with a lower tank 19 at a level below both the first inflatable and deflatable hose seals 7 and the second inflatable and deflatable hose seals 8. Such barometric leg 18 provides for complete and fast deflating (draining) of the first inflatable and deflatable hose seals 7 and of the second inflatable and deflatable hose seals 8.

If the inflating and deflating system 17 is configured to inflate and deflate both the first inflatable and deflatable hose seals 7 and the optional second inflatable and deflatable hose seals 8, the inflating and deflating system 17 comprises preferably, but not necessarily, as shown in FIGS. 4 to 6, a top tank 20 at a level above both the first inflatable and deflatable hose seals 7 and the second inflatable and deflatable hose seals 8. The top tank 20 is configured to inflate (fill) the first inflatable and deflatable hose seals 7 and the second inflatable and deflatable hose seals 8 by gravity with liquid. A booster pump 40 may be provided downstream of the top tank 20 to force liquid into the first inflatable and deflatable hose seals 7 and into the second inflatable and deflatable hose seals 8 so as to increase the pressure in the first inflatable and deflatable hose seals 7 and in the second inflatable and deflatable hose seals 8.

If the inflating and deflating system 17 is configured to inflate and deflate both the first inflatable and deflatable hose seals 7 and the optional second inflatable and deflatable hose seals 8 and if the inflating and deflating system 17 comprises a lower tank 19 and a top tank 20, as presented, the optional inflating and deflating system 17 comprises preferably, but not necessarily, as shown in FIGS. 4 to 6, a pump 29 configured to pump liquid from lower tank 19 to the top tank.

If the liquid filtration apparatus comprises both first inflatable and deflatable hose seals 7 and second inflatable and deflatable hose seals 8, as presented, and if the liquid filtration apparatus comprise an inflating and deflating system 17 configured to inflate and deflate both the first inflatable and deflatable hose seals 7 and the second inflatable and deflatable hose seals 8, as presented, the inflating and deflating system 17 comprises preferably, but not necessarily, as shown in FIGS. 7 and 8, a first barometric leg 21 in communication with the first inflatable and deflatable hose seals 7 and in communication with a first lower tank 22 at a level below the first inflatable and deflatable hose seals 7, and a second barometric leg 25 in communication with the second inflatable and deflatable hose seals 8 and in communication with a second lower tank 26 at a level below the second inflatable and deflatable hose seals 8.

The first lower tank 22 is preferably, but not necessarily, positioned 5 to 10 meters below the first inflatable and deflatable hose seals 7. Such first barometric leg 21 provides for complete and fast deflating (draining) of the first inflatable and deflatable hose seals 7. The second lower tank is preferably, but not necessarily, positioned 5 to 10 meters below the second inflatable and deflatable hose seals 8. Such barometric leg provides for complete and fast deflating (draining) of the second inflatable and deflatable hose seals 8.

If the liquid filtration apparatus comprises both first inflatable and deflatable hose seals 7 and second inflatable and deflatable hose seals 8, as presented, and if the liquid filtration apparatus comprise an inflating and deflating system 17 configured to inflate and deflate both the first inflatable and deflatable hose seals 7 and the second inflatable and deflatable hose seals 8, as presented, the inflating and deflating system 17 comprises preferably, but not necessarily, as shown in FIGS. 3 and 4, a first top tank 23 at a level above the first inflatable and deflatable hose seals 7, and a second top tank 27 at a level above the second inflatable and deflatable hose seals 8. The first top tank 23 is configured to inflate (fill) the first inflatable and deflatable hose seals 7 by gravity with liquid and the second the top tank 27 is configured to inflate (fill) the second inflatable and deflatable hose seals 8 by gravity with liquid. A booster pump 40 may be provided downstream of the first top tank 23 to force liquid into the first inflatable and deflatable hose seals 7 so as to increase the pressure in the first inflatable and deflatable hose seals 7 and a booster pump 40 may be provided downstream of the second top tank 27 to force liquid into the second inflatable and deflatable hose seals 8 so as to increase the pressure in the second inflatable and deflatable hose seals 8.

If the inflating and deflating system 17 comprises a first lower tank 22 and a first top tank 23, as presented, the optional inflating and deflating system 17 comprises preferably, but not necessarily, a first pump 24 configured to pump liquid from the first lower tank 22 to the first top tank 23.

If the inflating and deflating system 17 comprises a second lower tank 26 and a second top tank 27, as presented, the optional inflating and deflating system 17 comprises preferably, but not necessarily, a second pump 28 configured to pump liquid from the second lower tank 26 to the second top tank 27.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A liquid filtration apparatus, comprising:

a series of upright filter plates forming a filter plate pack, wherein filtering spaces are formed in the filter plate pack, wherein at least one filtering space comprises a filter chamber that is at least partly limited laterally by a filter media, wherein each of the filtering spaces has an elongate bottom discharge opening limited by two first opposite side walls, and wherein the elongate bottom discharge opening of the filtering spaces being provided with a first inflatable and deflatable hose seal extending across the elongate bottom discharge opening and configured to selectively open and close the elongate bottom discharge opening at the first inflatable and deflatable hose seal, wherein the first inflatable and deflatable hose seal being in the elongate bottom discharge opening fastened at one of the first opposite side walls of the elongate bottom discharge opening so that the first inflatable and deflatable hose seal is in a deflated state configured to be at the said one of the first opposite side walls of the elongate bottom discharge opening and so the first inflatable and deflatable hose seal is in an inflated state configured to extend between the first opposite side walls of the elongate bottom discharge opening.

2. The liquid filtration apparatus according to claim 1, wherein the first inflatable and deflatable hose seal being in the elongate bottom discharge opening arranged at least partly in a first recess in said one of the first opposite side walls of the elongate bottom discharge opening.

3. The liquid filtration apparatus according to claim 1, wherein a lower end of the filter media being at a level above the first inflatable and deflatable hose seal.

4. The liquid filtration apparatus according to claim 1, wherein a lower end of the filter media being at a level below the first inflatable and deflatable hose seal.

5. The liquid filtration apparatus according to claim 1, wherein a first support member for supporting the first inflatable and deflatable hose seal, and the first support member extending at least partly across the elongated bottom discharge opening.

6. The liquid filtration apparatus according to claim 1, wherein a first outer cover fastened above the first inflatable and deflatable hose seal to one of the first opposite side walls of the elongate bottom discharge opening.

7. The liquid filtration apparatus according to claim 1, further comprising:

end plugs at opposite ends of the first inflatable and deflatable hose seals.

8. The liquid filtration apparatus according to claim 1, wherein the first inflatable and deflatable hose seals comprise a hose member comprising an inner rubber lining and an outer rubber lining and a textile reinforcement.

9. The liquid filtration apparatus according to claim 1, further comprising:

an inflating and deflating system configured to inflate and deflate the first inflatable and deflatable hose seals.

10. The liquid filtration apparatus according to claim 1, wherein the filtering space comprises an elongate top opening limited by two second opposite side walls.

11. The liquid filtration apparatus according to claim 1, wherein the upright filter plates are aligned and parallel in the filter plate pack.

12. The liquid filtration apparatus according to claim 1, wherein the upright filter plates being arranged vertically in the filter plate pack.

13. The liquid filtration apparatus according to claim 1, wherein the upright filter plates being arranged immovable in contact with each other in the filter plate pack.

14. The liquid filtration apparatus according to claim 1, wherein the filtering spaces being provided within the upright filter plates of the filter plate pack.

15. The liquid filtration apparatus according to claim 1, wherein the filtering spaces being provided between two adjacent upright filter plates of the filter plate pack.

16. The liquid filtration apparatus according to claim 1, further comprising:

a material feeding arrangement configured to feed material to be filtered into filtering spaces of the filter plate pack.

17. The liquid filtration apparatus according to claim 1, further comprising:

a pressure arrangement configured to exert pressure on material fed into filtering spaces of the filter plate pack.

18. The liquid filtration apparatus according to claim 1, further comprising:

a filter cake receiving arrangement configured to receive filter cake from filtering space of the filter plate pack through the elongate bottom discharge openings of the filtering spaces.

* * * * *